(12) United States Patent
Lundgren

(10) Patent No.: US 10,226,028 B2
(45) Date of Patent: Mar. 12, 2019

(54) HORSE JACKET

(71) Applicant: EQUIMADE, Södra Sandby (SE)

(72) Inventor: Rachel Lundgren, Södra Sandby (SE)

(73) Assignee: EQUIMADE AB, Södra Sandby (SE)

(*) Notice: Subject to any disclaimer, the term of this patent is extended or adjusted under 35 U.S.C. 154(b) by 166 days.

(21) Appl. No.: 15/111,844

(22) PCT Filed: Feb. 5, 2015

(86) PCT No.: PCT/EP2015/052358
§ 371 (c)(1),
(2) Date: Jul. 15, 2016

(87) PCT Pub. No.: WO2015/118039
PCT Pub. Date: Aug. 13, 2015

(65) Prior Publication Data
US 2016/0330934 A1 Nov. 17, 2016

(30) Foreign Application Priority Data
Feb. 5, 2014 (EP) .................................... 14153972

(51) Int. Cl.
A01K 13/00 (2006.01)
B68C 5/00 (2006.01)

(52) U.S. Cl.
CPC .............. *A01K 13/008* (2013.01); *B68C 5/00* (2013.01)

(58) Field of Classification Search
CPC ........ B68C 5/00; A01K 13/006; A01K 13/008
USPC ............ 54/66, 67, 79.1, 79.2, 79.3; 119/850
See application file for complete search history.

(56) References Cited

U.S. PATENT DOCUMENTS

| | | | | |
|---|---|---|---|---|
| 189,172 A | * | 4/1877 | Ayres | A01K 13/006 54/79.1 |
| 195,371 A | * | 9/1877 | Horisk | A01K 13/006 54/79.1 |
| 846,812 A | * | 3/1907 | Vinton | A01K 13/008 5/498 |
| 4,671,049 A | * | 6/1987 | Benckhuijsen | A01K 13/008 5/502 |
| 4,955,182 A | * | 9/1990 | Newman | A01K 13/008 54/66 |
| 5,271,211 A | * | 12/1993 | Newman | A01K 13/008 54/79.2 |
| 6,467,244 B1 | * | 10/2002 | Kelley | A01K 13/008 119/850 |

(Continued)

FOREIGN PATENT DOCUMENTS

| CA | 2484576 A1 | 5/2006 |
|---|---|---|
| DE | 202011051469 U1 | 1/2013 |

OTHER PUBLICATIONS

International Search Report from corresponding International Patent Application No. PCT/EP2015/052358, dated Jun. 30, 2015.

*Primary Examiner* — Lisa L Tsang
(74) *Attorney, Agent, or Firm* — Ziegler IP Law Group, LLC

(57) ABSTRACT

A horse jacket includes a front portion and a rear portion. The front portion covers a chest part of a horse and the rear portion covers the back and side parts of the horse. The horse jacket further includes first and second attachment devices that connect first and second sides of the front portion to first and second sides of the rear portion. The front portion includes at least one filling element.

11 Claims, 4 Drawing Sheets

(56) References Cited

U.S. PATENT DOCUMENTS

| | | | | |
|---|---|---|---|---|
| 6,574,948 | B2* | 6/2003 | Longtin | A01K 13/008 54/79.2 |
| 6,877,300 | B1* | 4/2005 | Hathcock | A01K 13/008 54/79.2 |
| 8,015,948 | B2* | 9/2011 | Hall | A01K 13/006 119/850 |
| 2005/0126134 | A1 | 6/2005 | Hathcock | |
| 2006/0042200 | A1* | 3/2006 | Kwan | A01K 13/008 54/79.2 |
| 2008/0178564 | A1* | 7/2008 | McIntyre | A01K 13/006 54/66 |
| 2008/0216454 | A1* | 9/2008 | Lacow | A01K 13/008 54/79.2 |
| 2011/0185688 | A1 | 8/2011 | MacGuinness | |
| 2014/0237953 | A1* | 8/2014 | Strauss | B68C 1/126 54/66 |

\* cited by examiner

HORSE JACKET

FIELD OF THE INVENTION

The present invention relates to a horse jacket and a number of improvements therein, the horse jacket being more ergonomically constructed for both horse and stableman than conventional horse blankets.

BACKGROUND OF THE INVENTION

Horse blankets are commonly used to protect horses from cold, wind, rain, or heat. A conventional blanket, such as that shown in US 2005/0126134, is made in one piece, covers the chest, the back, and the sides of the horse, and has attachment means arranged on the chest and side sections of the blanket.

One disadvantage with such a blanket is that the blanket restricts the horse's movements and often leads to chafing at certain pressure points. A further disadvantage is that wind and precipitation can slip in under the blanket, since the blanket is not very form-fitted to the shape of the horse.

An improved horse blanket is shown in US 2011/0185688, wherein the blanket is split into front and rear sections which are connected to each other by a flexible joint. This flexible joint facilitates movement such that the horse is less restricted by the blanket than compared to a conventional blanket.

SUMMARY OF THE INVENTION

It is an object of the present invention to mitigate the above problems, and to provide an improved jacket which enables the horse to move ergonomically and less restricted, which prevents the weather elements from entering in under the jacket, and which at the same time offers extended protection for its muscles and organs, as well as minimizing the work for the stableman.

According to a first aspect of the present invention, these objects are achieved by a horse jacket comprising a front portion and a rear portion, wherein the front portion is adapted for covering a chest part of a horse and the rear portion is adapted for covering back and side parts of the horse, further comprising first attachment means arranged to connect a first side of the front portion to a first side of the rear portion and second attachment means arranged to connect a second side of the front portion to a second side of the rear portion, the front portion comprising at least one filling element.

A horse jacket having such a construction not only protects the sensitive parts of the horse's body, such as the shoulders, the neck, the withers, the stomach, and the throat, but is also particularly ergonomic since it absorbs the pressure from the jacket which is caused by the horse's movements, hence avoiding the occurrence of chafing. The filling element provides extra space for the front legs of the horse, allowing the horse to move freely.

In one embodiment, the filling element comprises two overlapping filling pads.

The front portion may further comprise an elastic portion arranged at least partially along an essentially U-shaped recess, adapted for abutting against an underside of a neck of the horse during use. The U-shape of the front portion and the elastic portion facilitates a fit which is sufficiently tight to provide protection from the elements, while at the same time being flexible enough such that the front portion yields when the horse's neck is directed downwards, for example when grazing, such that the pressure on the horse's neck is relieved.

In yet another embodiment, each attachment means comprises a set of buckles and a set of elongated connection means.

Each set of elongated connection means may comprise a zipper, at least one magnet, or a hook and loop fastener.

In one embodiment, the sets of buckles are connected by a webbing which extends across the front portion between the buckles.

According to a second aspect of the present invention, these objects are achieved by a horse jacket comprising a front portion and a rear portion, wherein the front portion is adapted for covering, a chest part of a horse and the rear portion is adapted for covering back and side parts of the horse, wherein a stomach section of the rear portion comprises a first side section, a centre section, and a second side section, the stomach section being arranged between two wedges, one on each opposing side of the stomach section, and the stomach section being adapted for being folded underneath a stomach of the horse such that the stomach section follows a curvature of, and lies in abutment with, the stomach during use.

A horse jacket having such a construction not only protects the sensitive parts of the horse's body, such as the stomach, the croup, and internal organs such as heart and lungs, but is also particularly ergonomic since it does not restrict the horse's movements.

According to a third aspect of the present invention, these objects are achieved by a horse jacket comprising a front portion and a rear portion, wherein the front portion is adapted for covering a chest part of a horse and the rear portion is adapted for covering back and side parts of the horse, wherein an end section of the rear portion is provided with at least one dart, the dart being tapered such that an amount of fabric being taken in is larger at an end closest to a tail of the horse than at an opposite end of the dart, such that the end section at least partially has a bowl shape and hence follows a curvature of, and lies in abutment with, hind legs of the horse during use.

A horse jacket having such a construction not only protects the sensitive parts of the horse's body, such as the croup and the semitendinosus muscles, but is also particularly ergonomic since it does not restrict the horse's movements.

According to a fourth aspect of the present invention, these objects are achieved by a neck portion for a horse jacket, adapted for surrounding a neck of a horse, the neck portion comprising a closure arranged at one side of the neck during use.

A horse jacket having such a construction not only protects the sensitive parts of the horse's body, such as the neck, the withers, and the throat, but is also particularly ergonomic for the stableman.

Generally, all terms used in the claims are to be interpreted according to their ordinary meaning in the technical field, unless explicitly defined otherwise herein. All references to "a/an/the [element, device, component, means, etc]" are to be interpreted openly as referring to at least one instance of said element, means, etc., unless explicitly stated otherwise. Further, by the term "comprising" it is meant "comprising but not limited to" throughout the application.

All references to top, bottom, upper, lower, front, back, vertical, horizontal, and to the body parts of the horse, etc relate to when the horse jacket is in use, i.e. when arranged on a horse.

Further, top/upper relates to an area which is arranged above a bottom/lower area as seen in the vertical direction, i.e. the area closest to the horse's back, while the bottom area is the area closest to the ground. Front relates to the area which is arranged closest to the head of the horse, while back relates to the area which is arranged closest to the tail of the horse, i.e. how they are located in the horizontal direction in relation to each other.

The use of first and second sides refers to the opposing parts of a section, e.g. two halves of two opposing outer edges. The use of outwards and inwards refers, if not otherwise specified, to the directions from the horse's body and towards the horse's body during use.

BRIEF DESCRIPTION OF THE DRAWINGS

This and other aspects of the present invention will now be described in more detail, with reference to the appended drawings showing a currently preferred embodiment of the invention.

DETAILED DESCRIPTION

Figure 1:
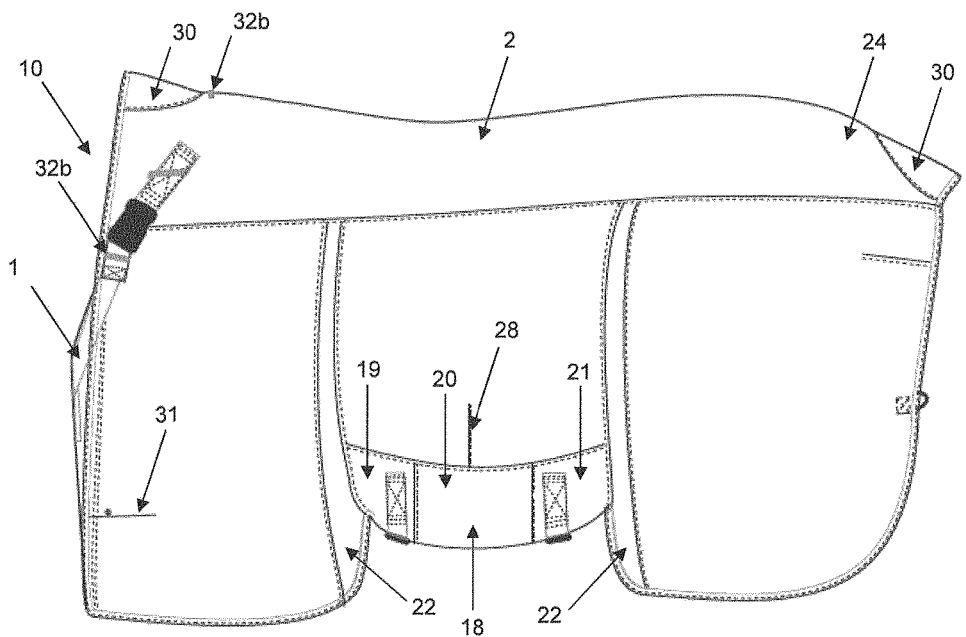
FIG. 1 shows a side view of an embodiment of the horse jacket according to the present invention.
Figure 5:
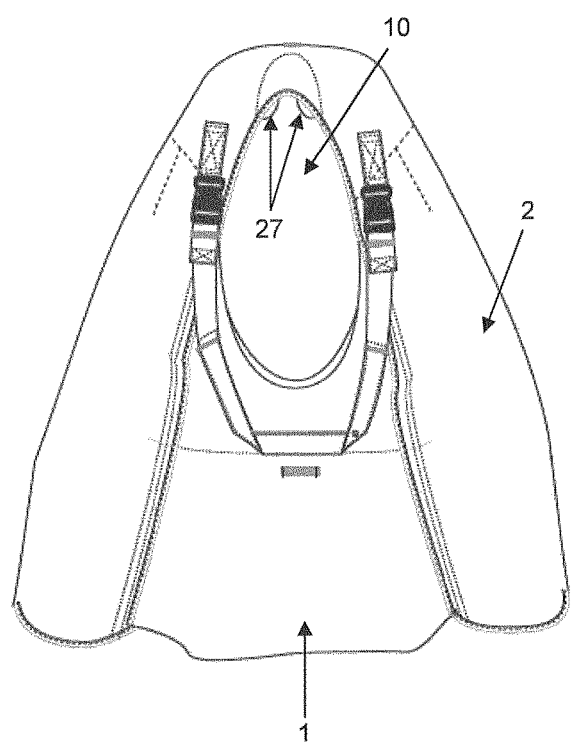
FIG. 5 shows a front view of an embodiment of the horse jacket according to the present invention.

FIGS. 1 and 5 show a front portion 1 and a rear portion 2 of a horse jacket according to the present invention, each portion comprising a number of layers of, e.g., outer fabric, padding, lining, and so on. By horse jacket is meant a type of horse blanket. The significant differences and improvements of the invention, when compared to a conventional horse blanket, justify the use of the new terminology "horse jacket".

The front portion 1 is adapted for covering the chest part of the horse, i.e. the part comprising the chest and, at least to some extent, the shoulders of the horse. The rear portion 2 is adapted for covering the rest of the horse's body such as the back, the sides, and, if so desired, the stomach. During use, the neck of the horse extends outwards through an opening 10 in the jacket, which is formed by edges of both front 1 and rear 2 portions. The neck itself may also be covered by a neck portion 3 which is to be detachably arranged at the opening 10. This is described separately below.

FIGS. 1, 3, 4, and 5 show first 4 and second 5 attachment means. The first attachment means 4 are arranged to connect the first side 6 of the front portion 1 to the first side 7 of the rear portion 2, and the second attachment means 5 are arranged to connect the second side 8 of the front portion 1 to the second side 9 of the rear portion 2. By first 6 and second 8 sides of the front portion 1 is meant the two halves of the front portion 1, and by first 7 and second 9 sides of the rear portion 2 is meant the two areas of the rear portion 2 which are to be connected to the first 6 and second 8 sides of the front portion, respectively. I.e., the first side 6 of the front portion 1 and the first side 7 of the rear portion 2 are, during use, connected to each other approximately in the area of a first shoulder of the horse, while the second side 8 of the front portion 1 and the second side 9 of the rear portion 2 are connected to each other approximately in the area of a second shoulder of the horse. Hence, the neck of the horse will protrude from the opening 10 which is formed by edges of the front 1 and rear 2 portions. The attachment means 4, 5 will be described in more detail later on in the description.

Figure 4:
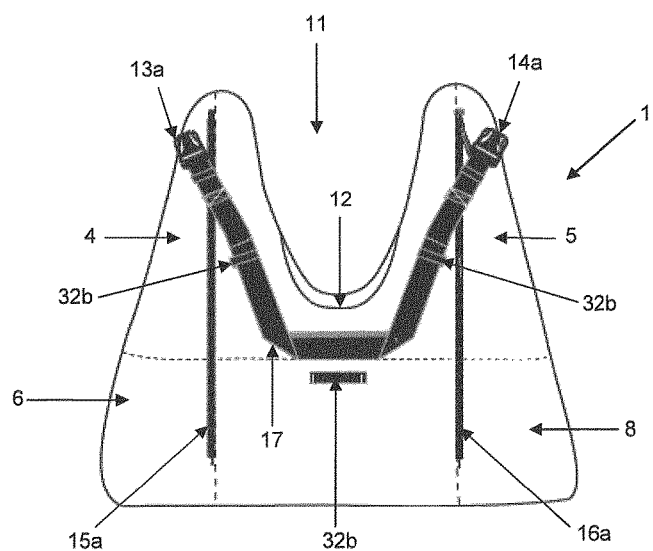
FIG. 4 shows a front view of an embodiment of the front portion of the horse jacket according to the present invention.

FIG. 4 shows the front portion 1 separately. The front portion 1 is preferably tapered in the vertical direction such that it is wider at the bottom than at the top, which facilitates free movement of the front legs of the horse without hindering the horse's shoulder blades, while at the same time providing a tight fit at the base of the neck of the horse.

The front portion 1 is provided with an essentially U-shaped recess 11 in order to accommodate the underside of the horse's neck.

Figure 6:
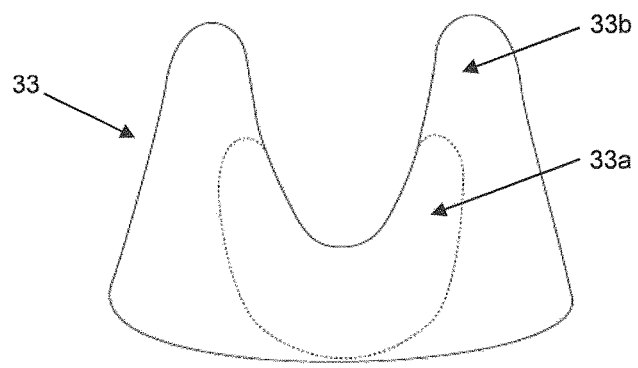
FIG. 6 shows a front view of the filling elements arranged within an embodiment of the front portion of the horse jacket according to the present invention.
Figure 7:
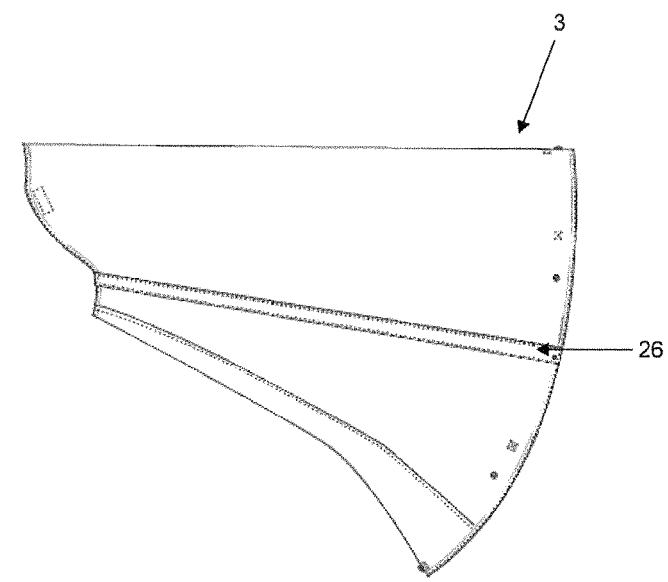
FIG. 7 shows a side view of an embodiment of a closed neck portion of the horse jacket according to the present invention.

FIG. 6 shows a filling element 33 arranged within the front portion 1. The filling element 33 is preferably arranged as close to the horse's body as possible, in order to distribute the pressure on the body over a larger area, hence avoiding pressure on only a certain pressure point. The filling element 33 preferably comprises two overlapping filling pads 33a, 33b, e.g. having the same thickness, being of the same material, but having different shapes. The material in the filling pad may be foam or any other suitable material. A first filling pad 33a, being arranged closest to the horse's body, preferably has a U-shape corresponding to the above mentioned U-shaped recess 11. The first filling pad 33a softens the edge against the horse's neck. A second filling pad 33b is arranged in abutment with the first filling pad 33a on its outside, as seen in a direction from the horse's body. The second filling pad 33b preferably has an essentially square shape provided with the above mentioned U-shaped recess 11. The second filling pad 33b covers a larger surface area than the first filling pad 33a, preferably such that it extends beyond the shoulders of the horse, such that the second filling pad 33b functions as a shield against the wind and also lifts the fabric outwards, creating a free space for the front legs of the horse. However, the second filling pad 33b is smaller than the entire front portion 1, i.e. the lower part of the front portion comprises only loose fabric while the upper part of the front portion comprises fabric and the filling pads 33a, 33b.

The front portion 1 further comprises an elastic portion 12. In one embodiment, the elastic portion 12 is an elastic material lining at least a part of the edge of the recess 11, which lies in abutment with a horse's neck. The elastic material 12 softens the edge of the recess 11 such that the front portion yields when the horse's neck is bent downwards in order to graze.

As mentioned above, first attachment means 4 are arranged to connect the first side 6 of the front portion 1 to the first side 7 of the rear portion 2, and second attachment means 5 are arranged to connect the second side 8 of the front portion 1 to the second side 9 of the rear portion 2. The first 4 and second 5 attachment means preferably have the same configuration, which in one embodiment of the invention constitutes a set of buckles 13, 14 and a set of elongated connection means 15, 16. Each individual set of buckles 13, 14 comprises one buckle part 13a, 14a arranged on the front portion 1 and one buckle part 13b, 14b arranged on the rear portion 2. The set of elongated connection means 15, 16 preferably comprises a zipper, which will be described in more detail later on in the description.

The sets of buckles 13, 14 also comprise webbing 17 used to connect the buckle parts 13a, 14a to each other and to the front portion 1. Preferably, the webbing 17 extends across the front portion 1 such that it connects the first side 6 of the front portion 1 to the first side 7 of the rear portion 2 by one buckle 13a arranged at one end of the webbing 17, and the second side 8 of the front portion 1 to the second side 9 of the rear portion 2 by one buckle 14a arranged at the opposite end of the webbing 17. I.e., the two buckles 13a, 14a share the same webbing 17. The webbing 17, arranged between the two buckles 13a, 14a, extends approximately with the same shape as the recess 11 of the front portion 1. Hence, the webbing 17 is arranged essentially in an angular U-shape. This U-shape is arranged with a wider angle than that of the U-shaped recess 11, i.e. the webbing 17 extends outside the recess 11. The webbing is folded over itself at two instances in order to achieve the U-shape.

As previously mentioned, the set of elongated connection means 15, 16 preferably comprises a zipper. However, the elongated connection means 15, 16 could consist of any other suitable means such as at least one magnet or a hook and loop fastener. The zipper is arranged such that one part 15a, 16a of the zipper is arranged on the front portion 1 and the other, corresponding part 15b, 16b is arranged on the rear portion 2. More specifically, the first part 15a of the first zipper is arranged on the first side 6 of the front portion 1, where it extends essentially vertically. The second part 15b of the first zipper is arranged on the first side 7 of the rear portion 2, also extending essentially vertically. The second zipper is arranged in a corresponding way. The first part 16a of the second zipper is arranged on the second side 8 of the front portion, where it extends essentially vertically. The second part 16b of the second zipper is arranged on the second side 9 of the rear portion 2, also extending essentially vertically.

Figure 3:
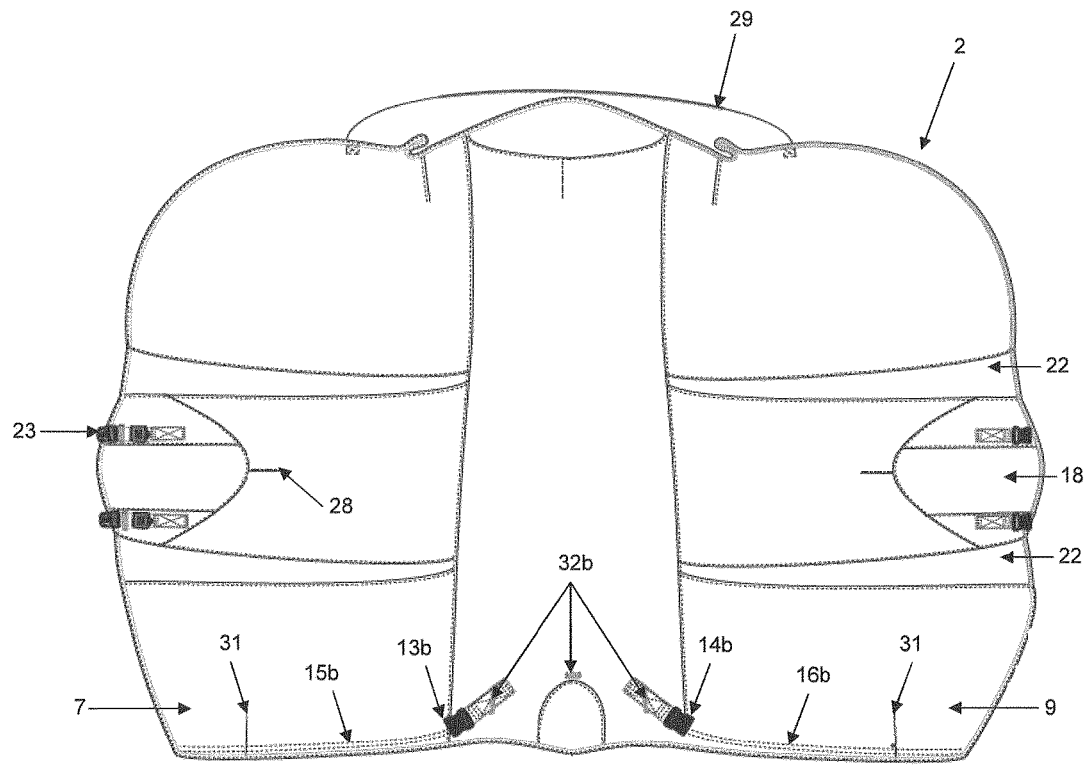
FIG. 3 shows a top view of an embodiment of the rear portion of the horse jacket according to the present invention.

FIG. 3 shows the rear portion 2 of the jacket. The rear portion 2 is constructed to interact tightly with the front portion 1 in order to enable the horse to move ergonomically and less restricted and at the same time to offer extended protection for its muscles and organs, as well as minimizing the work for the stableman.

The front edges of the rear portion 2, i.e. the first 7 and second 9 sides, each comprise a small fold 31. The fold is sown approximately from the very edge of the rear portion up until the elongated connection means 15, 16, in a horizontal direction towards the tail of the horse during use. Thereafter the sown fold unfolds until there is no fold at all. The fold 31 creates a curvature in the fabric which provides extra room for the horse's shoulder.

In one embodiment, at least one of the stomach sections 18 of the rear portion 2, i.e. the parts closest to the ground during use, comprises a number of individual sections, namely a first side section 19, a centre section 20, and a second side section 21. These sections are arranged after each other, as seen in the horizontal direction. Each section 19, 20, 21 has an individual shape such that the combination of all sections results in a curved bowl shape. The stomach section 18 is adapted for being folded underneath the stomach of the horse such that it forms a bowl which follows a curvature of, and lies in abutment with, at least a part of the stomach during use, which gives the jacket an ergonomic shape which follows the arched form of the horse's ribs and stomach. This shape is facilitated further by use of two wedges 22 of fabric, one arranged essentially vertically on each side of the stomach section 18. Preferably, both stomach sections 18 have the above described construction and are adapted for meeting at the middle of the horse's stomach.

The two stomach sections 18 are connected to each other by the use of a number of surcingles 23, preferably two such surcingles 23, provided with a buckle each, attached to either stomach section 18 for connecting the two stomach sections to each other at the stomach area. The enclosure of the stomach prevents unwanted exposure while simultaneously providing the horse with freedom of movement. This arrangement further prevents moisture from reaching the exposed parts around the front and hind legs.

Preferably, the rear portion 2 of the jacket is provided with a dart 28 running vertically in order to further facilitate the arched bowl shape of the jacket. The dart 28 does not run along the entire vertical height of the jacket, on the contrary it is limited to a short distance in the area closest to said stomach section 18.

The rear portion 2 is in general constructed to apply the pressure from the jacket in front of the shoulder blade (scapula) instead of on the shoulder blade, as well as offload the pressure from the top of withers. Hence, the rear portion 2 has a withers section which is cushioned with a first cushion 27, one on each side of the withers, in order to allow air to circulate and to significantly reduce the pressure on the withers. At the back of the withers section, i.e. the part closest to the tail of the horse, there is an additional cushion arranged underneath the first cushion, i.e. closer to the horse during use, in order to offload pressure when the horse bows its head down. The cushions 27 are separated such that each cushion will lie in abutment with one side of the withers, respectively, leaving the top of the withers free. The cushions preferably have the same thickness.

Figure 2:
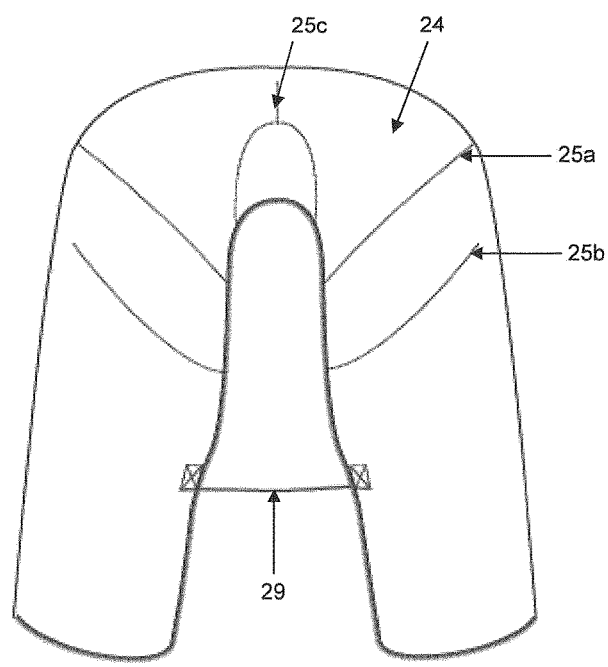
FIG. 2 shows a rear view of an embodiment of the horse jacket according to the present invention.

FIGS. 1 and 2 show the very end section 24 of the rear portion 2 of the jacket, i.e. the section being closest to the tail of the horse during use. The end section 24 is provided with at least one dart 25, preferably two 25a, 25b, on each side of the rear portion 2, i.e. on each side of the horse's croup, and one dart 25c on the top of the horse's croup. The dart 25a arranged closest to the top of the rear portion is preferably longer than the dart 25b arranged closest to the bottom of the rear portion 2. Each dart 25a, 25b, 25c extends essentially in a direction along the back of the horse. However, the dart may extend somewhat curved.

Each dart 25a, 25b, 25c is tapered such that the amount of fabric being taken in is larger at the end closest to the tail of the horse than at the opposite end of the dart. This results in the end section 24 having, at least partially, a three-dimensional, arched bowl shape such that it follows the curvature of, and lies in abutment with, the hind legs of the horse. This facilitates complete coverage of the semitendinosus muscles located at the horse's rear portion.

FIG. 2 also shows a tail cord 29 comprising of an elastic ribbon at least partially covered with a plastic material. The tail cord 29 is fastened to each end of the rear portion 2 of the jacket using a loop and a kind of cord lock, such that the length of the tail cord is adjustable. The very ends of the cord 29 are provided with stops for avoiding that the cord slips out of the cord lock.

Further, both a small area 30 closest to the withers and a small area closest to the tail, of the rear portion 2, may be configured such that the fabric of the horse jacket is somewhat elevated for avoiding pressure and allowing air to circulate. These elevated areas 30 are created by fastening the edge of a patch of fabric to an edge of an opening in the main fabric, when the opening is smaller than the patch.

Figure 8:
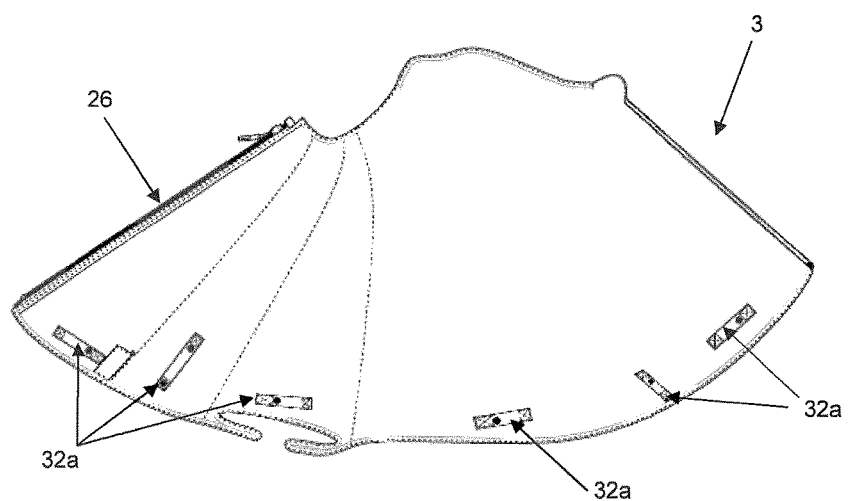
FIG. 8 shows a side view of an embodiment of an open neck portion of the horse jacket according to the present invention.

FIGS. 1 and 8 show a neck portion 3, adapted for surrounding the neck of the horse during use. The neck portion 3 has a construction which facilitates the section to cover the whole neck, including jugular veins, trachea, and oesophagus. The neck portion 3 is preferably made of the same material as the front 1 and rear 2 portions, and is easily attached to at least the rear portion 2. The neck portion 3 is closed by a closure 26, e.g. a zipper or a hook and loop fastener, arranged at one side of the neck during use. This side closure 26 allows the stableman to access the neck portion 3 more easily by being able to put the neck portion 3 on or to remove it without having to reach in underneath the horse's neck.

The neck portion 3 and the front 1 and rear 2 portions are preferably provided with an arrangement for fastening the neck portion 3 to the front 1 and rear 2 portions. This arrangement comprises a number of first textile ribbons 32a arranged on the neck portion 3, preferably three such ribbons arranged one on each side of the horses neck and one on the very top of the horses neck during use, and corresponding second ribbons 32b arranged on the front 1 and rear 2 portions. Each first ribbon 32a has one free end which is to be thread through a loop, formed by the corresponding second ribbon 32b, the two ends of which are fastened permanently on the front 1 and rear 2 portions. The free end of the first ribbon 32a is thereafter fastened to the neck portion 3 e.g. by a push button. In this way, the first ribbon 32a runs with some flexibility through the loop formed by the corresponding second ribbon 32b, and therefore the neck portion 3 is somewhat moveable in relation to the front 1 and rear 2 portions. This increases the flexibility of the horse jacket. The first 32a and second 32b ribbons could of course have any other suitable configuration, such as clasp and eye, or hook and loop.

The person skilled in the art realizes that the present invention by no means is limited to the preferred embodiments described above. On the contrary, many modifications and variations are possible within the scope of the appended claims. For example, the described parts of the horse jacket are preferably combined in one proper jacket.

The invention claimed is:

1. A horse jacket comprising:
   a front portion and a rear portion, wherein said front portion is configured to cover a chest part of a horse and said rear portion is configured to cover back and side parts of said horse, said jacket further comprising:
   first attachment means configured to connect a first side of said front portion to a first side of said rear portion, and second attachment means configured to connect a second side of said front portion to a second side of said rear portion, wherein said front portion comprises a U-shaped recess configured to abut against an underside of a neck of said horse during use; and
   at least one filling element, said at least one filling element comprising:
   a first filling pad and a second filling pad, the second filling pad overlapping the first filling pad, wherein
   the first filling pad has a U-shape corresponding to the U-shaped recess;
   a first side of said first filling pad abuts against the chest part of the horse on a horse-facing side of the jacket,
   a second opposite side of the first filling pad abuts a first side of the second filling pad; and
   a second opposite side of the second filling pad abuts an exterior-facing surface of the horse jacket that is opposite to the horse-facing side of the jacket, wherein said second filling pad covers a larger surface area than said first filling pad, and wherein the second filling pad is smaller than the front portion.

2. The horse jacket according to claim 1, wherein said front portion further comprises an elastic portion arranged at least partially along said U-shaped recess.

3. The horse jacket according to claim 2, wherein each of said attachment means comprises a set of buckles and a set of elongated connection means.

4. The horse jacket according to claim 3, wherein each set of elongated connection means comprises a zipper, at least one magnet, or a hook and loop fastener.

5. The horse jacket according to claim 1, wherein each of said attachment means comprises a set of buckles and a set of elongated connection means.

6. The horse jacket according to claim 5, wherein each set of elongated connection means comprises a zipper, at least one magnet, or a hook and loop fastener.

7. The horse jacket according to claim 6, wherein said sets of buckles are connected by a webbing which extends across said front portion between respective buckles of the sets of buckles.

8. The horse jacket according to claim 5, wherein said sets of buckles are connected by a webbing which extends across said front portion between respective buckles of the sets of buckles.

9. The horse jacket according to claim 1, wherein the at least one filling element creates a free space between the horse jacket and the front legs of the horse.

10. The horse jacket according to claim 1, wherein the at least one filling element lifts at least a portion of the chest portion of the horse jacket away from legs of the horse.

11. The horse jacket according claim 1 wherein the first filling pad is disposed on top of the first side of the second filling pad.

* * * * *